Sept. 23, 1930.　　A. GEFFON ET AL　　1,776,659
FORCE FEED LUBRICATOR
Filed June 2, 1924
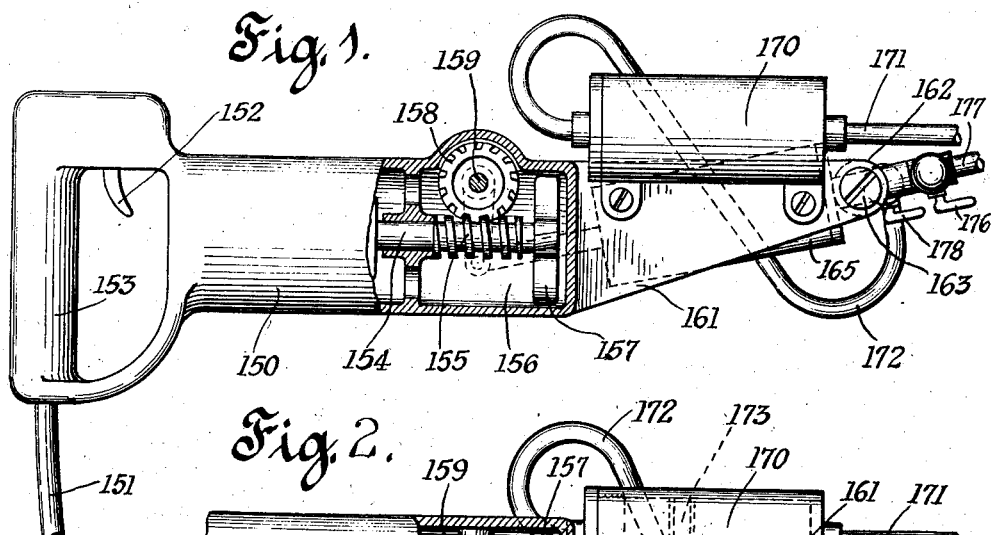
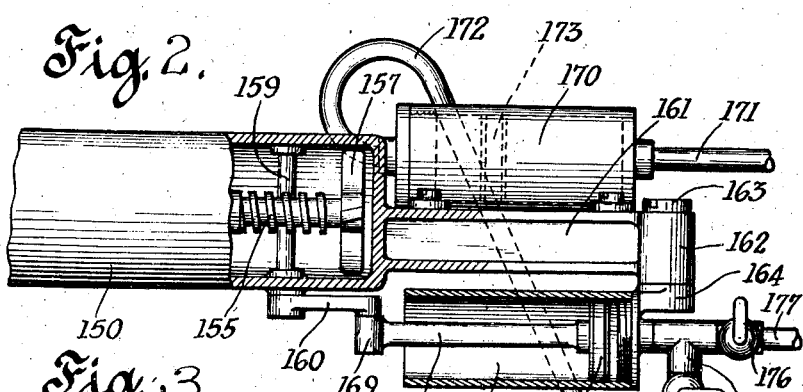
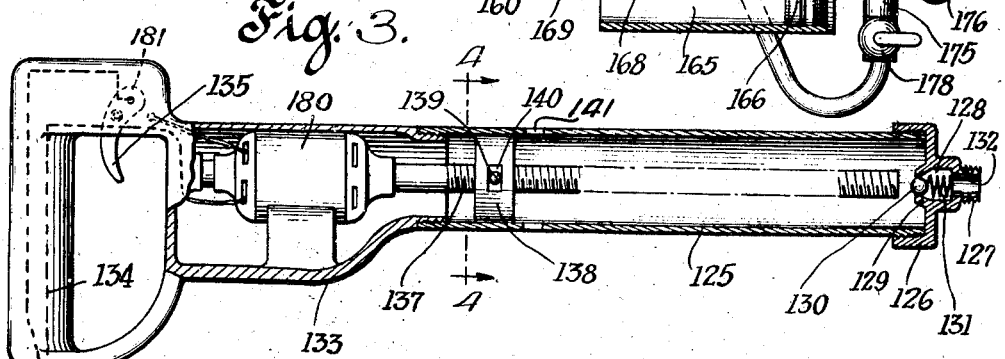
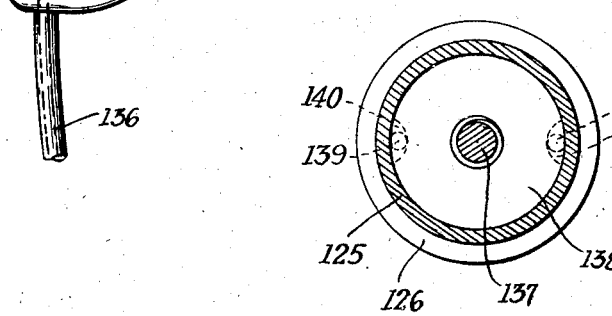
Abraham Geffon
John Holtzman
INVENTORS
BY Charles L. Wright
ATTORNEY Patented Sept. 23, 1930

1,776,659

UNITED STATES PATENT OFFICE

ABRAHAM GEFFON AND JOHN HOLTZMAN, OF NEW YORK, N. Y.

FORCE-FEED LUBRICATOR

Application filed June 2, 1924. Serial No. 717,310.

This invention relates to improvements in apparatus used in connection with automobiles and like self-propelled vehicles for affording a supply of compressed air used in inflating the tires and further, for supplying lubricant under pressure to any desired parts of the vehicle.

The principal object of the invention is to provide a portable apparatus including an electric motor arranged to drive either a rotary air pump or a device for forcing a lubricant to wherever it may be desired.

These and other similar objects are attained by the novel construction, combination and arrangement of parts hereinafter described and shown in the accompanying drawings, forming a material part of this disclosure, and in which:—

Figure 1 is a side elevational view of a combined power operated air and grease pump.

Figure 2 is a similar view taken in a different plane.

Figure 3 is a side view of a further modification in grease pump construction.

Figure 4 is an enlarged transverse sectional view taken on line 4—4 of Fig. 3.

A self contained power operated grease force pump is shown in Figs. 3 and 4, in which a cylinder 125 is provided with a discharge cap 126 having an extending nozzle 127 and containing a chamber 128.

This chamber is arranged with a conical portion 129 suited to serve as a seat for the spherical valve 130, held normally thereagainst by the spring 131, the same abutting a collar 132 fixed in the nozzle.

The rear end of the cylinder 125 is fixedly engaged with a casing 133 provided with a spade handle 134 and having a trigger 135 to actuate a switch as 181, controlling current entering the casing by a conductor 136, to energize an electric motor 180 within the casing.

A screw threaded piston rod 137 is geared to the motor shaft to run at a reduced speed and mounted on the rod is a piston 138 held from rotating in the cylinder to which it is neatly fitted, by spherical detents 139 freely movable in cam recesses 140 in opposite sides of the piston 138.

Thus as the motor is operated rectilinear motion is transmitted to the piston which is caused to move towards the discharge end of the cylinder, forcing out such quantity of grease as may be required, the piston being returned by reversing the motor, air entering openings 141 in the cylinder to prevent back pressure caused by the moving piston.

A further modification is illustrated in Figs. 1 and 2, in which a power operated, combined air and grease pump is shown.

In this device a motor, not shown, is carried in the casing 150 supplied with current by the conductor 151 and controlled by the switch actuating trigger 152, the latter being adjacent to the spade handle 153 by which the apparatus is manipulated.

The motor shaft 154 has formed on its extending portion a worm 155, operating in the outer chamber 156 of the casing and has on its end a fan 157 acting to produce a cooling current of air to maintain the motor at an equable temperature.

The worm 155 engages the teeth of a worm wheel 158 rotatable in an extension of the chamber casing, the wheel being fixed to a spindle 159 one end of which extends through the casing and has rigidly attached to it a crank arm 160.

Integral with the casing 150 is an extension 161 ending in a transverse boss 162, carrying a rotatable stud 163 by which is attached a lug 164 formed on a cylinder 165 open at its rearwardly extending end.

Movable in this cylinder is a piston 166 provided with the usual packings and having a valve admitting air on its outward stroke, this piston being fixed on a piston rod 168 provided with a transverse hub 169 suited to engage a wrist pin fixed in the crank arm 160.

Bolted to the extension 161 is another cylinder 170 having closed heads, one of which, at the delivery end, connects with a pipe 171 for dispensing lubricants, and the other head has a connection suited to receive the end of a tube 172, there being a floating piston 173 within the cylinder 170 for pressing the contents outwardly when advanced by an air current.

The closed end of the cylinder 165 is in communication with a T fitting 175, its straight opening being controlled by a valve 176 leading to an air discharge pipe 177 and the side opening of the fitting is similarly controlled by a valve 178 leading to the tube 172.

When it is desired to use the apparatus for supply in air under compression, as for filling a tire, the valve 178 will be closed and the valve 176 opened, the motor started, whereupon it will be obvious that, due to the action of the pump a powerful stream of air will be delivered.

If it be desired to force grease into bearings or the like, the valve 176 will be closed and the valve 178 opened, the air from the pump then passing through the tube 172 to the cylinder 170 exerting force upon the piston 173 and causing exudation of the grease in the cylinder.

While certain preferred embodiments of this device have been shown and described, it will be understood that changes in the form, arrangements, proportions, sizes and details thereof may be made without departing from the scope of the invention as defined in the appended claims.

Having thus described our invention, what we claim as new and desire to secure by Letters Patent, is:—

1. A portable, power driven apparatus, for forcibly feeding lubricants adapted to be carried in the hand of the user and adapted to be supported in operative position by the hand of the user, comprising a casing having a motor compartment therein, a handle on said casing, an electric motor housed in said compartment, a cylinder in threaded engagement with the motor casing and having a discharge opening at one end thereof, a piston movable in said cylinder, means for operating said piston including a threaded spindle arranged in said cylinder and operatively connected to said piston and said motor whereby lubricant is forced through said opening in the cylinder on the rotation of said motor, and a motor switch associated with said casing.

2. A hand portable, power driven apparatus for forcing lubricants, comprising a cylinder adapted to contain a supply of lubricant and provided at its forward end with a discharge opening, a piston adapted to be moved continuously in one direction lengthwise of the cylinder to discharge the supply of lubricant, a casing having a grip for the operator's hand extending from said cylinder and arranged approximately coaxially therewith, an electric motor housed in said casing, means actuated by said motor to move said piston, said means including a threaded spindle engaging and passing centrally through the piston to force the lubricant out of the cylinder through the discharge opening of said cylinder, and a switch for controlling the operation of the motor.

3. A hand portable feed device for ejecting a supply of viscous material contained in said device comprising a motor casing, motor controlling means on said casing, an electric motor enclosed by said casing, a handle at one end of said casing by means of which the device may be carried about by the user, independent of any other support, a supply cylinder, designed to contain the entire supply of material to be fed by said device, arranged forwardly of the motor and removably secured at one end substantially in alignment with and to the other end of the motor casing, and a piston in said cylinder movable from one end to the other end of the cylinder on the rotation of the motor in a given direction for discharging the supply of material in the cylinder.

4. A portable lubricant feeding apparatus comprising a casing, a handle grip at one end of said casing adapted to be gripped by the hand of an operator for supporting said apparatus, an electric motor housed in said casing, a switch adjacent the handle grip arranged for operation by a finger of the operator while the operator's hand is grasping said grip for controlling the operation of said motor, a cylinder secured at one end to the other end of the casing, a threaded spindle in said cylinder, and means actuated by the spindle to force the lubricant out of the other end of said cylinder under pressure.

5. A portable power driven apparatus adapted to be carried and the weight thereof supported by the hand of the user, comprising a casing having a motor compartment therein, a handle on said casing, an electric motor housed in said compartment, an armature shaft for said motor, a cylindrical casing detachably fastened at one of its ends to one end of said first casing, a reciprocatory member housed in the cylindrical casing and operatively connected to the armature shaft for movement in the direction of the longitudinal axis thereof, a cover detachably fastened to the other end of said cylindrical casing and an electric switch located in the handle for the operation of said motor.

6. A portable power driven apparatus adapted to be carried about, supported by and operated by the hand of the user, comprising a cylinder adapted to be filled with lubricant, a casing having a grip for the operator's hand detachably secured at one end to one end of said cylinder, an electric motor housed in said casing and having an armature shaft concentric with the cylinder and extending a substantial length into the interior of said cylinder, a reciprocatory member operatively connected to and actuated by said shaft in the direction of the axis of said cylinder and a cover detachably fastened to the outer end of the cylinder casing.

7. A portable power driven tool adapted to be carried by the hand of the user comprising a first casing, a second cylindrical shaped casing and a cover for said cylindrical casing, said casings being detachably secured to each other end to end, an electric motor housed in the first casing and having an armature shaft, a disc-like member of substantially the inner diameter of the cylindrical casing operatively connected to and actuated by the armature shaft in the direction of the longitudinal axis of said second casing and a motor switch associated with said first casing.

In testimony whereof we have signed our names to this specification.

ABRAHAM GEFFON.
JOHN HOLTZMAN.